United States Patent
Brundridge et al.

(10) Patent No.: US 9,424,148 B2
(45) Date of Patent: Aug. 23, 2016

(54) AUTOMATIC FAILOVER IN MODULAR CHASSIS SYSTEMS

(71) Applicant: Dell Inc, Round Rock, TX (US)

(72) Inventors: Michael Brundridge, Georgetown, TX (US); Sudhir Vittal Shetty, Cedar Park, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 393 days.

(21) Appl. No.: 13/972,567

(22) Filed: Aug. 21, 2013

(65) Prior Publication Data

US 2015/0058659 A1    Feb. 26, 2015

(51) Int. Cl.
*G06F 11/20* (2006.01)

(52) U.S. Cl.
CPC .......... *G06F 11/2025* (2013.01); *G06F 11/203* (2013.01); *G06F 11/2035* (2013.01)

(58) Field of Classification Search
CPC   G06F 11/2025; G06F 11/203; G06F 11/2035
See application file for complete search history.

(56) References Cited

U.S. PATENT DOCUMENTS

| | | | | |
|---|---|---|---|---|
| 7,512,830 | B2* | 3/2009 | Chu | G06F 11/2028 714/4.11 |
| 2003/0033366 | A1* | 2/2003 | Garnett | G06F 1/183 709/203 |
| 2010/0180161 | A1* | 7/2010 | Kern | G06F 11/2028 714/47.2 |
| 2010/0332890 | A1* | 12/2010 | Chen | G06F 9/5077 714/2 |
| 2011/0185221 | A1* | 7/2011 | Talaugon | G06F 11/2028 714/4.11 |
| 2013/0227340 | A1* | 8/2013 | Talaugon | G06F 11/2028 714/4.12 |
| 2014/0277784 | A1* | 9/2014 | Mick | G05D 23/1917 700/286 |

* cited by examiner

*Primary Examiner* — M Elamin
(74) *Attorney, Agent, or Firm* — Fogarty, L.L.C.

(57) ABSTRACT

Systems and methods for automatic failover in modular chassis systems. In some embodiments, a modular chassis includes a chassis management controller and a plurality of server blades. A first of the plurality of server blades may be configured to detect an internal fault to and to transmit a corresponding alert message to the chassis management controller via a midplane connection. Moreover, the chassis management controller may be configured to initiate a migration procedure to transfer one or more workloads from the first server blade to a second of the plurality of server blades.

14 Claims, 5 Drawing Sheets

AUTOMATIC FAILOVER IN MODULAR CHASSIS SYSTEMS

FIELD

This disclosure relates generally to computer systems, and more specifically, to systems and methods for automatic failover in modular chassis systems.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some cases, certain IHSs may be housed within a modular chassis system. Generally speaking, a modular chassis is an enclosure capable of providing shared power, cooling, networking, and/or management infrastructure to a plurality of IHSs, such as server blades, input/output (I/O) modules, storage devices, switches, etc.

SUMMARY

Embodiments of systems and methods for automatic failover in modular chassis systems are described herein. In an illustrative, non-limiting embodiment, a modular chassis includes a chassis management controller and a plurality of server blades, where a first of the plurality of server blades is configured to detect an internal fault to and to transmit a corresponding alert message to the chassis management controller via a midplane connection, and where the chassis management controller is configured to initiate a migration procedure to transfer one or more workloads from the first server blade to a second of the plurality of server blades.

For example, the alert message may be transmitted without using Simple Network Management Protocol (SNMP) and/or the midplane connection may excludes cables. In some cases, the alert message may indicate a processor or memory failure. The alert message may include remedial action information indicating whether the migration procedure is appropriate.

The chassis management controller may be further configured to place the first server blade in maintenance mode in response to the remedial action information indicating a critical failure. Additionally or alternatively, the chassis management controller may be configured to select the second server blade among the plurality of server blades and provision an identity previously assigned to the first server blade to the second server blade. Additionally or alternatively, the chassis management controller may be configured to prevent the first server blade from being manually turned on while in maintenance mode and restart the first server blade with a new identity.

For instance, The identity and the new identity may include at least one of: a media access control (MAC) address, a world wide port name (WWPN), or a world wide node name (WWNN). Additionally or alternatively, the identity and the new identity may be received by the chassis management controller from an external memory containing a pool of unique identities.

In another illustrative, non-limiting embodiment, a method may include receiving, at a chassis management controller of a modular chassis via a midplane connection, a message from one of a plurality of server blades indicating a fault, where each of the plurality of server blades is located in a different slot of the modular chassis. The method may also include determining, by the chassis management controller, that the fault invokes a failover procedure and migrating, under control of the chassis management controller, a workload from the one of the plurality of server blades to another one of the plurality of server blades. The method may further include assigning, by the chassis management controller, an identity previously provided to the one of the plurality of server blades to the other one of the plurality of server blades and shutting down, under control of the chassis management controller, the one of the plurality of server blades.

In some implementations, the alert message may be transmitted without using Simple Network Management Protocol (SNMP). Also, the midplane connection may exclude cable. Also, the fault may be a hardware fault.

The method may also include preventing, by the chassis management controller, the one of the plurality of server blades from being manually turned on. The identity may include a MAC address, a WWPN, or a WWNN. Further, the identity may be obtained by the chassis management controller from an external memory containing a pool of unique identities.

In yet another illustrative, non-limiting embodiment, a non-transitory computer-readable medium may include program instructions stored thereon that, upon execution by a chassis management controller of a modular chassis having a plurality of server blades, cause the chassis management controller to: receive via a midplane connection a message from one of the plurality of server blades indicating a fault that invokes a failover procedure, migrate a workload from the one of the plurality of server blades to another one of the plurality of server blades, and assign an identity previously provided to the one of the plurality of server blades to the other one of the plurality of server blades. For example, in some implementations, the fault may be a software fault.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail in FIG. 5.

As described above, IHSs may be physically housed within a modular chassis system. Again, modular chassis are physical enclosures capable of providing shared power, cooling, networking, and/or management infrastructure to a plurality of IHSs, such as server blades, input/output (I/O) modules, storage devices, switches, etc. In traditional implementations, a single chassis may include a plurality of servers, and these servers may benefit from failover services that are provided and/or managed by an external console. In broad terms, a failover procedure involves switching an active workload (e.g., a software application, a hardware process, stored data, etc.) from a given server to a redundant or standby server upon the failure of the given server.

Figure 1:
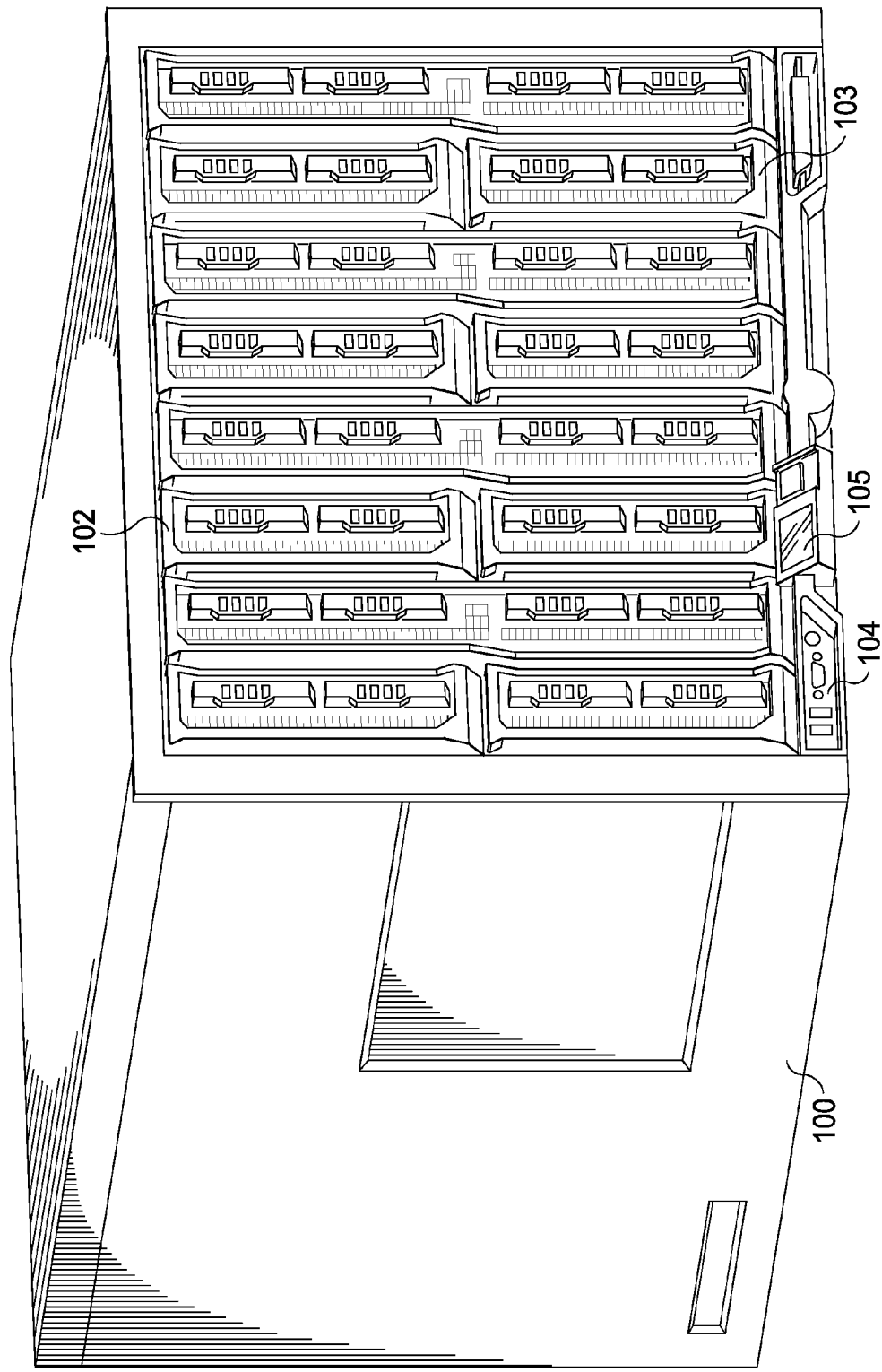
FIG. 1 shows a three-dimensional view illustrating the front end of an example of a modular chassis according to some embodiments.

FIG. 1 shows a three-dimensional view illustrating the front end of an example of modular chassis 100 according to some embodiments. Chassis 100 is configured to house a plurality of components, including blade servers 102 and 103, for example. In some cases, chassis 100 may include display 105 and I/O connectors 104. Display 105 may provide certain status and configuration information regarding the chassis or its components, whereas I/O connectors 104 may include ports and interfaces such as Universal Serial Bus (USB), audio, video, serial, parallel, Ethernet, etc. that enable a user to interact with the chassis.

Figure 2:
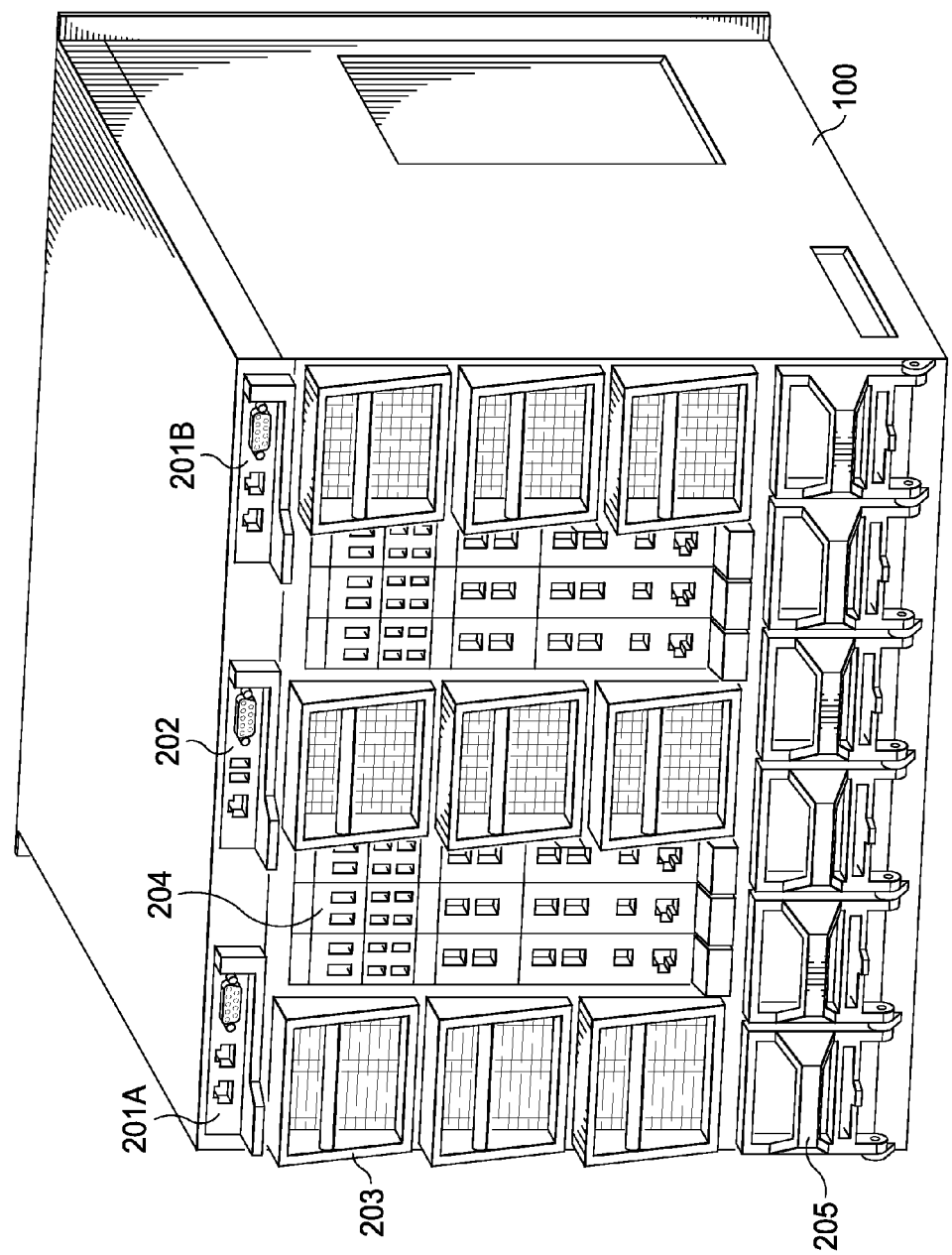
FIG. 2 shows a three-dimensional view illustrating the rear end of an example of a modular chassis according to some embodiments.

FIG. 2 shows a three-dimensional view illustrating the rear end of chassis 100 according to some embodiments. As illustrated, the back of chassis 100 houses another plurality of components, including first or primary chassis management controller (CMC) 201A, second or standby CMC 201B, and keyboard, video and mouse (KVM) module 202. Chassis 100 also includes a plurality of fans 203, switches 204, and power supplies 205.

Each of CMCs 201A/B includes a systems management hardware and software system for managing chassis 100. For example, in various implementations, CMCs 201A/B may each include its own microprocessor and memory, and may be powered by modular chassis 100 itself. In some configurations, a single one of CMCs 201A/B may be used. When both CMCs 201A/B are used, however, if primary CMC 201A loses communication with chassis 100, standby CMC 201B takes over chassis management. For ease of explanation, CMCs 201A/B may be collectively referred to below simply as "CMC 201."

In operation, CMC 201 may be configured to allow a user (e.g., an administrator) to view inventory, perform configuration and monitoring tasks, remotely turn on or off servers, enable alerts for events on servers and components in chassis 100, etc. Traditionally, the primary purposes of CMC 201 have been related to power (e.g., monitoring consumption, granting power allocation and power on request, setting maximum limits, efficiency, etc.) and thermal management (e.g., temperature sensing, setting fan speed, etc.). As discussed in more detail herein, however, in some embodiments CMC 201 may be used to manage and/or provide automatic failover services.

Modular chassis 100 may also include a midplane (not shown) configured to perform internal connections between elements seen in the rear and the front ends of chassis 100. For example, in some cases, communication between the inserted server blades (e.g., blade servers 102 and 103) and rear modules (e.g., switches 204) may be performed via a vertical, passive midplane, which operates similarly as a backplane, but has physical connectors at both sides where the front side is dedicated for blade servers and the back for I/O modules. The midplane may also include a printed circuit board (PCB) or the like with conductive traces (e.g., copper, etc.) effecting connections between the respective pins of corresponding connectors.

In some implementations, the various modules and components of FIGS. 1 and 2 may be inserted or removed from chassis 100 while chassis 100 is running or turned on ("hot swapping"). In various configurations, chassis 100 may be hold any number (e.g., 32) of quarter-height blade servers, half-height blades, full-height blades, or a mix of them. It should be noted, however, that chassis 100 is described for sake of illustration only, and that many variations (e.g., number of components, distribution of components, etc.) may be present in other chassis.

Figure 3:
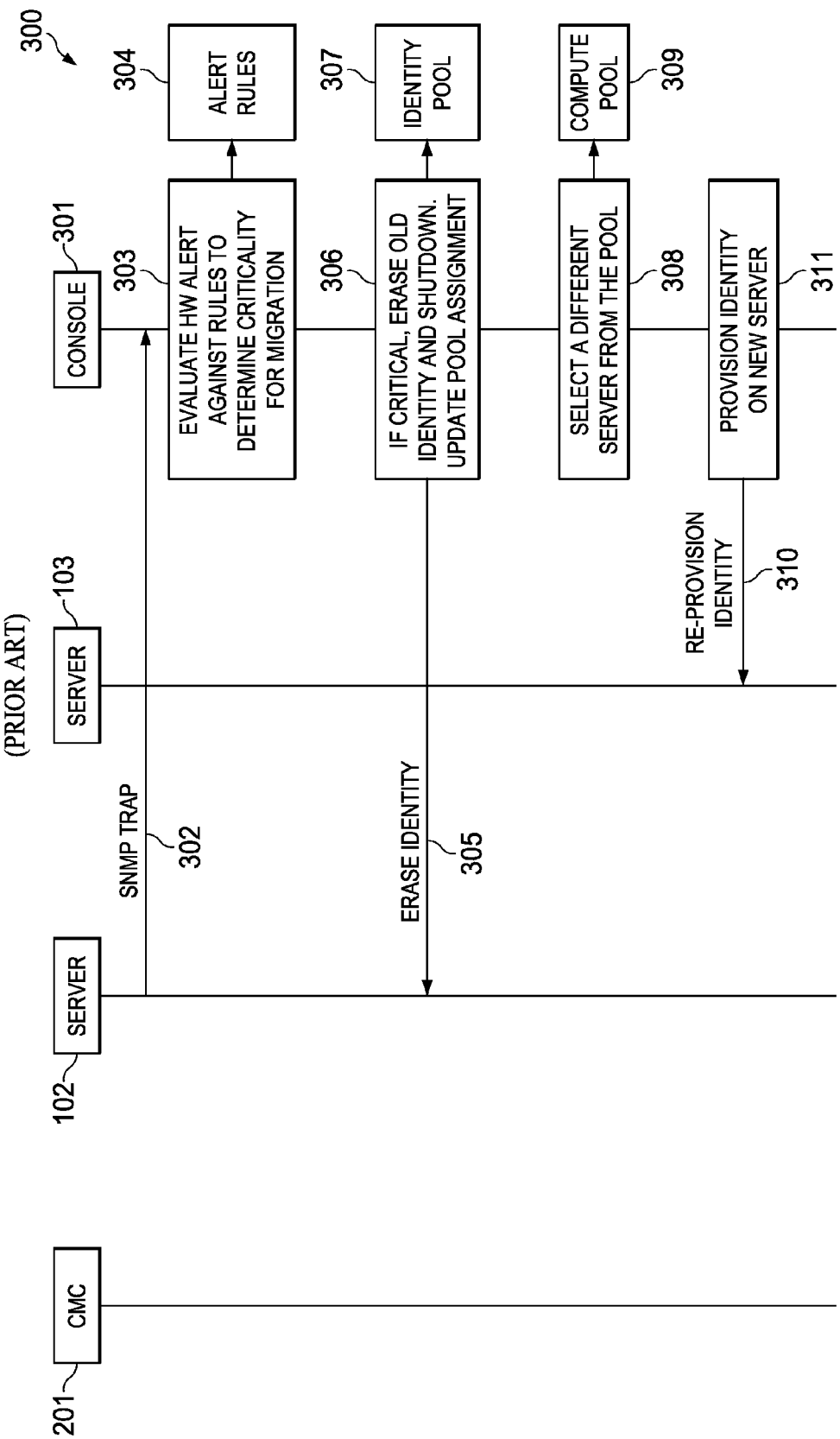
FIG. 3 shows a prior art workflow for enabling hardware failover.

To better illustrate the manner in which traditional hardware failover services have been provided in a chassis such as chassis 100, FIG. 3 shows prior art workflow 300 for enabling those services. As described above, modular chassis 100 may physically house CMC 201 as well as blade servers 102 and 103 and a plurality of other components. In contrast with embodiments described in more detail below, however, here CMC 201 is not involved in the failover process of workflow 300. Instead, when a hardware problem arises in a given one of servers 102 or 103, the failover process is managed by external console 301. Notably, external console 301 resides outside of modular chassis 100 and is communicatively coupled thereto via cable(s) and/or network(s).

External console 301 may be capable of communicating with servers 102-103 via any network and/or fabric configured to communicatively couple various computing devices. For example, a suitable network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data and/or messages.

When server 102 detects a hardware problem, it transmits a Simple Network Management Protocol (SNMP) trap 302 containing one or more hardware alerts to external console 301. At block 303, external console 301 evaluates the hardware alert(s) against predetermined rules to determine whether the alert(s) are sufficiently critical to warrant initiating a failover procedure and migrating workload(s) from server 102 to another redundant or otherwise available server. To effect such an evaluation, external console 301 may maintain a database of alert rules 304 that correlate, for each type of hardware failure (e.g., processor failure, memory error, etc.), and indication of whether the failure requires workload migration.

At block 306, if the external console 301's evaluation determines that the hardware failure is critical, external console 301 sends another message 305 (e.g., through a Web Services-Management or WSMAN interface or the like) to server 102 erasing the identity of the slot within which server 102 is inserted, and shutting server 102 down. It is noted that, in workflow 300, each slot in chassis 100 is assigned its own identity, and that slot's identity therefore also becomes the identity of any server inserted therein. In some cases, the identities may be assigned by CMC 201 and tied to the slot. Once a blade is removed from a given slot, it does not carry with it the identity of the slot. If that same blade is then re-inserted into a new slot, however, it will assume the identity associated with the new slot. Additionally or alternatively, identities may be assigned by external console 301. Examples of identity include, but are not limited to, media access control (MAC) addresses, world wide port names (WWPNs), world wide node names (WWNNs), and the like. Then, external console 301 updates an identity pool in database 307 by listing the identity of server 102's slot as being available.

At block 308, external console 301 selects a different server from a pool of available servers indicated in database 309. In this case, server 103 is selected. Finally, at block 311, external console 301 sends yet another message 310 to server 103 provisioning the identity previously held by server 102 now to server 103. As such, any ongoing workloads previously executed or stored on server 102 are migrated to server 103. Also, for example, subsequent requests that would otherwise be routed to server 102 within the chassis are now sent to server 103, and outgoing messages leaving server 103 identify server 103 with the same identity previously used by server 102.

In short, a typical workflow for enabling a deployment to migrate from server 102 (which has a critical hardware problem) to server 103 requires an external console 301 to monitor for faults, maintain identity pool 307, erase the identity of server 102, and re-provision it on server 103. As such, the inventors hereof have recognized numerous problems with workflow 300, some of which are enumerated below.

First, there is a potential loss in transit of SNMP trap 302 because SNMP commonly runs over the User Datagram Protocol (UDP), where delivery is not assured and dropped packets are not reported, thus potentially resulting in external console 301 not being notified of a critical fault. Second, workflow 300 depends upon external console 301 to facilitate the identity re-provisioning on a different server. Third, workflow 300 relies upon identity pool 307 that has to be maintained by external console 301 with individual identities created manually by an administrator and therefore with no guarantee of uniqueness. Fourth, alert rules 304 need to be maintained at external console 301 if or when the set of faults gets revised with new platforms and/or firmware revisions of blade servers 102-103. Fifth, even if external console 301 is unable to reliably erase the identity from the failing server, it may still enable the user to force the workload migration. This may result in server 102 booting up with the same identity as server 103, which causes network conflicts and potential operating system and/or data store corruption.

To address these, and other concerns, certain systems and methods described herein provide automatic failover in modular chassis systems. In some cases, these systems and methods allow intelligence in the chassis firmware to re-provision a faulty server automatically, without relying on external consoles. Also, each server may indicate the remedial action required in response to the fault to enable the chassis to perform the failover process. In some cases, an external memory (e.g., a secure digital (SD) card or the like) may be used as an identity pool for dynamic re-provisioning of compute resources and not statically binding it to a specific slot in the chassis. Moreover, certain chassis capabilities may be leveraged to provide redundant CMC for high availability, dedicated and isolated internal management network with optional redundant hardware paths, ability to pool compute resources from multiple chassis (in some cases, up to 9 modular chassis via CMC multi-chassis management (MCM) for a total of 288 compute servers per MCM managed complex), etc.

Figure 4:
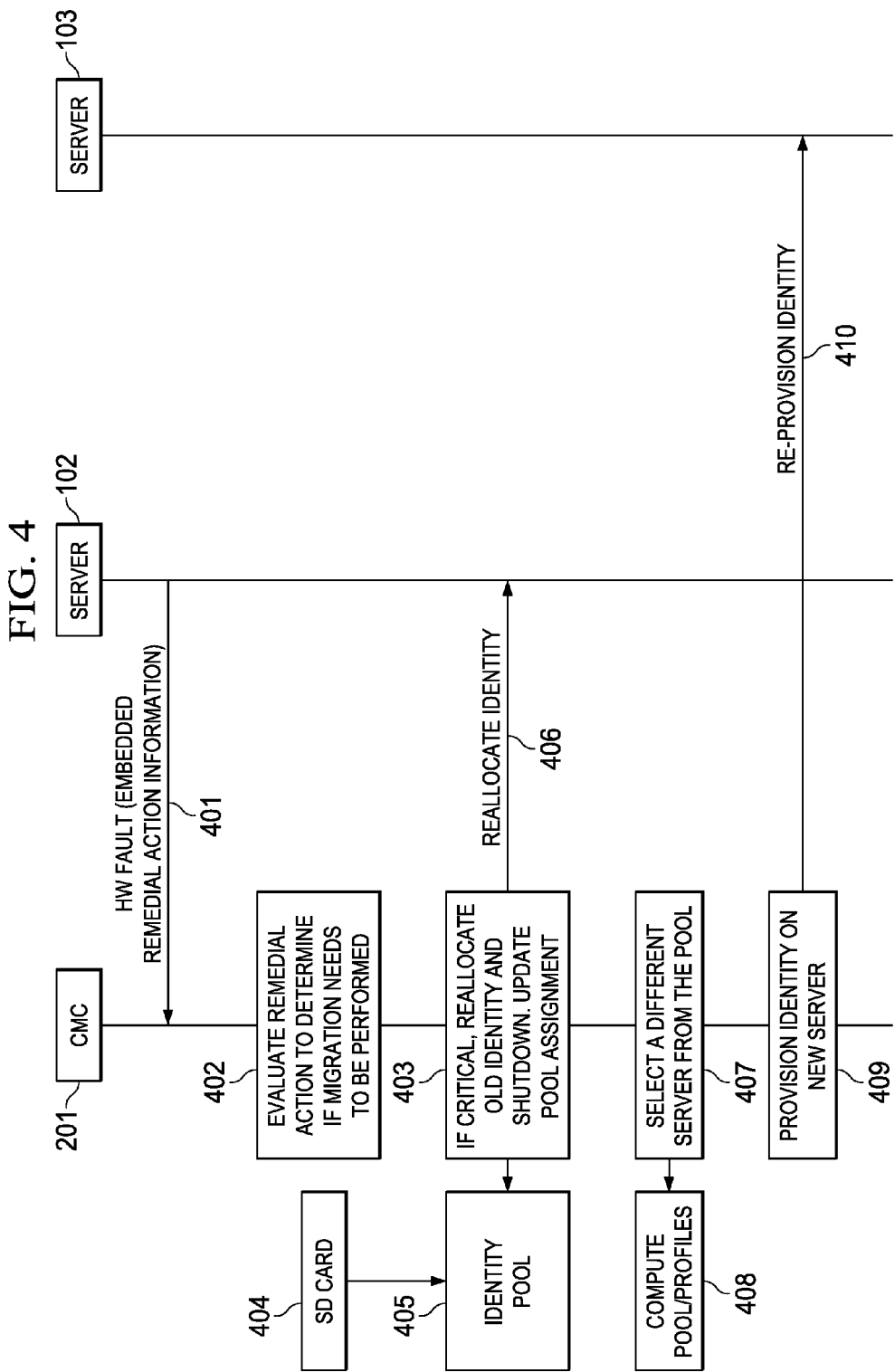
FIG. 4 shows an example of a workflow for enabling hardware failover according to some embodiments.

FIG. 4 shows an example of workflow 400 for enabling hardware failover according to some embodiments. In this example, server 102 detects a fault (e.g., a hardware or software problem) and generates failure alert 401, which is accompanied by an enumerated recommendation for the remedial action (e.g., migrate workloads) that are sent to CMC 201 via an internal hardware channel in the chassis midplane. This step eliminates the potential loss in transit of the alert delivery described in in connection with SNMP trap 302 of workflow 300 in FIG. 3. Also, because the rules around the remedial action are determined by server 102 itself, this step also addresses the problem of new platforms and/or firmware revisions of servers 102-103 requiring corresponding updates in alert database 304 in external console 301.

At block 402, CMC 201 evaluates the remedial action indicated in failure alert 401 and determines if workload migration needs to be performed. To perform the migration, CMC 201 maintains a pool of compute resources 408 within its domain listing which of the chassis server blades is available to receive other server's workloads, and which is configurable by an administrator with appropriate failover policies. CMC 201 also has access to pool of identities 405 generated from identity seed information (e.g., starting MAC, number of supported MACs) on SD card 404 (or other external memory source), and is copied over to a serial electrically erasable programmable read only memory (SEEPROM) of the like on chassis 100, which addresses the lack of identity uniqueness issue of workflow 300.

Furthermore, in some embodiments, CMC 201 may be configured to provision templates and/or profiles that are tied to specific blades 102-103. During the process of deployment, an identity from identity pool 405 gets associated with the profile that is attached to the blade. Thus, each of servers 102-103, as opposed to each of these servers' slots, is assigned its own identity by CMC 201.

At block 403, upon determining that workload migration is to be performed, CMC 201 sends message 406 to server 102 via the chassis midplane erasing its identity, and updates pool database 405 to indicate that the identity is now available. CMC 201 also places server 102 in maintenance mode, such that server 102 cannot be manually turned on by an administrator by inadvertently pressing a power switch or the like.

At block 407, CMC 201 selects server 103 as a standby server for server 102 based upon compute pool 408 (e.g., by determining that server 103 has availability, by using a load balancing algorithm, etc.), which has the profile of each blade in chassis 100. Then, at block 409, CMC 201 provisions the identity previously associated with server 102 to server 103 by sending re-provisioning message 410 via the chassis midplane, thus invoking the workload migration process from server 102 to server 103. In some cases, for example, server 103 may reboot in the same state that server 102 was when its fault was detected or message 401 sent to CMC 201. Also, because CMC 201 controls the power and identity allocation of server 102, it avoids the issue of accidental network conflicts caused by server 102 inadvertently booting up.

In some embodiments, two or more chassis may be communicatively coupled together to form a chassis sub-network, such as a virtual local area network (VLAN) or the like. In these cases, CMC 201 may be configured to include servers from other chassis within the same VLAN in compute pool 408 when selecting a standby or available server. In other words, still referring to the example of FIG. 4, server 102 may be physically inserted into a slot of chassis 100, and server 103 may be inserted into a distinct, separate chassis coupled to the same sub-network as chassis 100.

Figure 5:
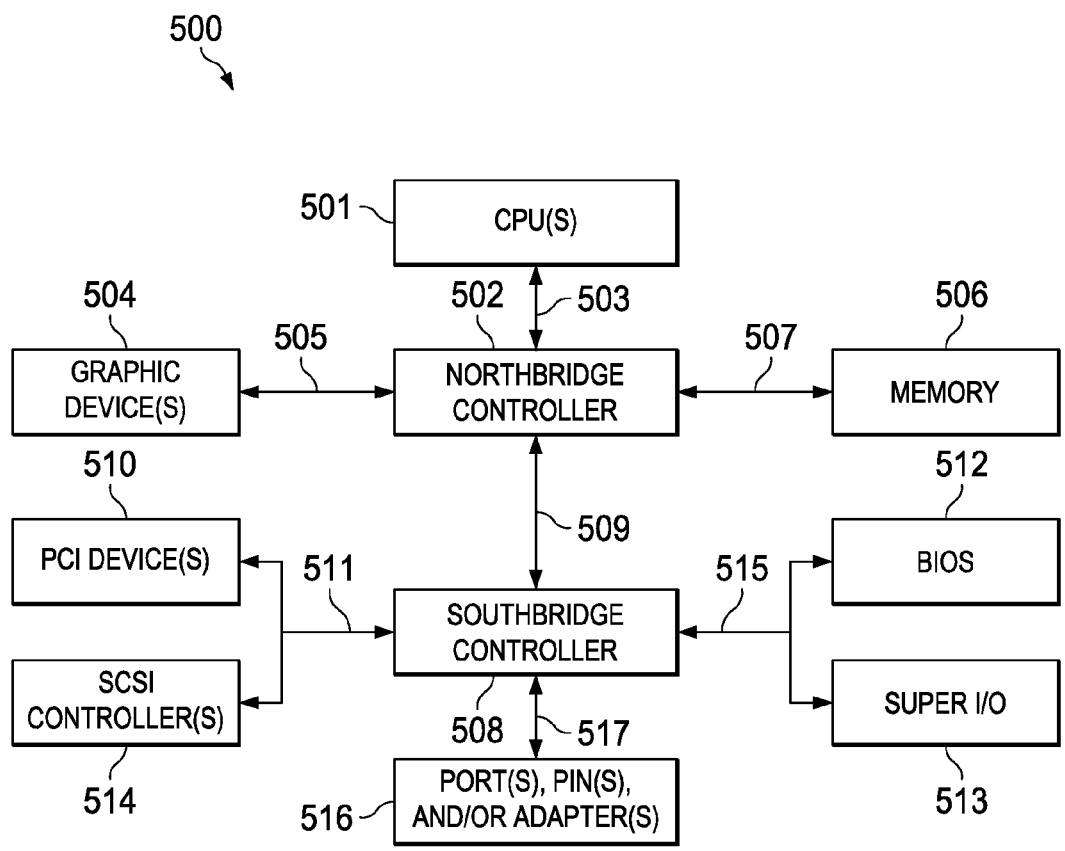
FIG. 5 is a block diagram of an example of an Information Handling System (IHS) according to some embodiments.

FIG. 5 is a block diagram an example of IHS 500 which may be used to implement CMC 201, blade servers 102-103, and/or external console 301. As shown, IHS 500 includes one or more CPUs 501. In various embodiments, IHS 500 may be a single-processor system including one CPU 501, or a multi-processor system including two or more CPUs 501 (e.g., two, four, eight, or any other suitable number). CPU(s) 501 may include any processor capable of executing program instructions. For example, in various embodiments, CPU(s) 501 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) 501 may commonly, but not necessarily, implement the same ISA.

CPU(s) 501 are coupled to northbridge controller or chipset 501 via front-side bus 503. Northbridge controller 502 may be configured to coordinate I/O traffic between CPU(s) 501 and other components. For example, in this particular implementation, northbridge controller 502 is coupled to graphics device(s) 504 (e.g., one or more video cards or adaptors, etc.) via graphics bus 505 (e.g., an Accelerated Graphics Port or AGP bus, a Peripheral Component Interconnect or PCI bus, etc.). Northbridge controller 502 is also coupled to system memory 506 via memory bus 507. Memory 506 may be configured to store program instructions and/or data accessible by CPU(s) 501. In various embodiments, memory 506 may be implemented using any suitable memory technology, such as static RAM (SRAM), synchronous dynamic RAM (SDRAM), nonvolatile/Flash-type memory, or any other type of memory.

Northbridge controller 502 is coupled to southbridge controller or chipset 508 via internal bus 509. Generally speaking, southbridge controller 508 may be configured to handle various of IHS 500's I/O operations, and it may provide interfaces such as, for instance, Universal Serial Bus (USB), audio, serial, parallel, Ethernet, etc., via port(s), pin(s), and/or adapter(s) 516 over bus 517. For example, southbridge controller 508 may be configured to allow data to be exchanged between IHS 500 and other devices, such as other IHSs attached to a network. In various embodiments, southbridge controller 508 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 508 may also enable connection to one or more keyboards, keypads, touch screens, scanning devices, voice or optical recognition devices, or any other devices suitable for entering or retrieving data. Multiple I/O devices may be present in IHS 500. In some embodiments, I/O devices may be separate from IHS 500 and may interact with IHS 100 through a wired or wireless connection. As shown, southbridge controller 508 is further coupled to one or more PCI devices 510 (e.g., modems, network cards, sound cards, video cards, etc.) and to one or more SCSI controllers 514 via parallel bus 511. Southbridge controller 508 is also coupled to Basic I/O System (BIOS) 512 and to Super I/O Controller 513 via Low Pin Count (LPC) bus 515.

BIOS 512 includes non-volatile memory having program instructions stored thereon. Those instructions may be usable CPU(s) 501 to initialize and test other hardware components and/or to load an Operating System (OS) onto IHS 500. Super I/O Controller 513 combines interfaces for a variety of lower bandwidth or low data rate devices. Those devices may include, for example, floppy disks, parallel ports, keyboard and mouse, temperature sensor and fan speed monitoring/control, etc.

In some cases, IHS 500 may be configured to provide access to different types of computer-accessible media separate from memory 506. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 500 via northbridge controller 502 and/or southbridge controller 508.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 500 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 502 may be combined with southbridge controller 508, and/or be at least partially incorporated into CPU(s) 501. In other implementations, one or more of the devices or components shown in FIG. 5 may be absent, or one or more other components may be added. Accordingly, systems and methods described herein may be implemented or executed with other IHS configurations.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A modular chassis, comprising:
a chassis management controller; and
a plurality of server blades, wherein a first of the plurality of server blades is configured to detect an internal fault to and to transmit a corresponding alert message to the chassis management controller via a midplane connection, and wherein the chassis management controller is configured to:
initiate a migration procedure to transfer one or more workloads from the first server blade to a second of the plurality of server blades, wherein the alert message includes remedial action information, the remedial action information indicating whether the migration procedure is appropriate;
place the first server blade in maintenance mode in response to the remedial action information indicating a critical failure;
select the second server blade among the plurality of server blades;
provision an identity previously assigned to the first server blade to the second server blade;
prevent the first server blade from being manually turned on while in maintenance mode; and
restart the first server blade with a new identity.

2. The modular chassis of claim 1, wherein the alert message is transmitted without using Simple Network Management Protocol (SNMP), and wherein the midplane connection excludes cables.

3. The modular chassis of claim 1, wherein the alert message indicates a processor or memory failure.

4. The modular chassis of claim 1, wherein the identity and the new identity include at least one of: a media access control (MAC) address, a world wide port name (WWPN), or a world wide node name (WWNN).

5. The modular chassis of claim 4, wherein the identity and the new identity are received by the chassis management controller from an external memory containing a pool of unique identities.

6. A method, comprising:
receiving, at a chassis management controller of a modular chassis via a midplane connection, a message from one of a plurality of server blades indicating a fault, wherein each of the plurality of server blades is located in a different slot of the modular chassis;
determining, by the chassis management controller, that the fault invokes a failover procedure;
migrating, under control of the chassis management controller, a workload from the one of the plurality of server blades to another one of the plurality of server blades;
assigning, by the chassis management controller, an identity previously provided to the one of the plurality of server blades to the other one of the plurality of server blades;
shutting down, under control of the chassis management controller, the one of the plurality of server blades; and
preventing, by the chassis management controller, the one of the plurality of server blades from being manually turned on.

7. The method of claim 6, wherein the alert message is transmitted without using Simple Network Management Protocol (SNMP), and wherein the midplane connection excludes cables.

8. The method of claim 6, wherein the fault is a hardware fault.

9. The method of claim 6, wherein the identity includes at least one of: a media access control (MAC) address, a world wide port name (WWPN), or a world wide node name (WWNN).

10. The method of claim 9, wherein the identity is obtained by the chassis management controller from an external memory containing a pool of unique identities.

11. A memory device having program instructions stored thereon that, upon execution by a chassis management controller of a modular chassis having a plurality of server blades, cause the chassis management controller to:
receive via a midplane connection a message from one of the plurality of server blades indicating a fault that invokes a failover procedure;
migrate a workload from the one of the plurality of server blades to another one of the plurality of server blades;
assign an identity previously provided to the one of the plurality of server blades to the other one of the plurality of server blades; and
prevent the one of the plurality of server blades from being manually turned on.

12. The non transitory computer readable medium memory device of claim 11, wherein the alert message is transmitted without using Simple Network Management Protocol (SNMP), and wherein the midplane connection excludes cables.

13. The memory device of claim 11, wherein the fault is a software fault.

14. The memory device of claim 11, wherein the identity includes at least one of: a media access control (MAC) address, a world wide port name (WWPN), or a world wide node name (WWNN).

* * * * *